Figure 1:
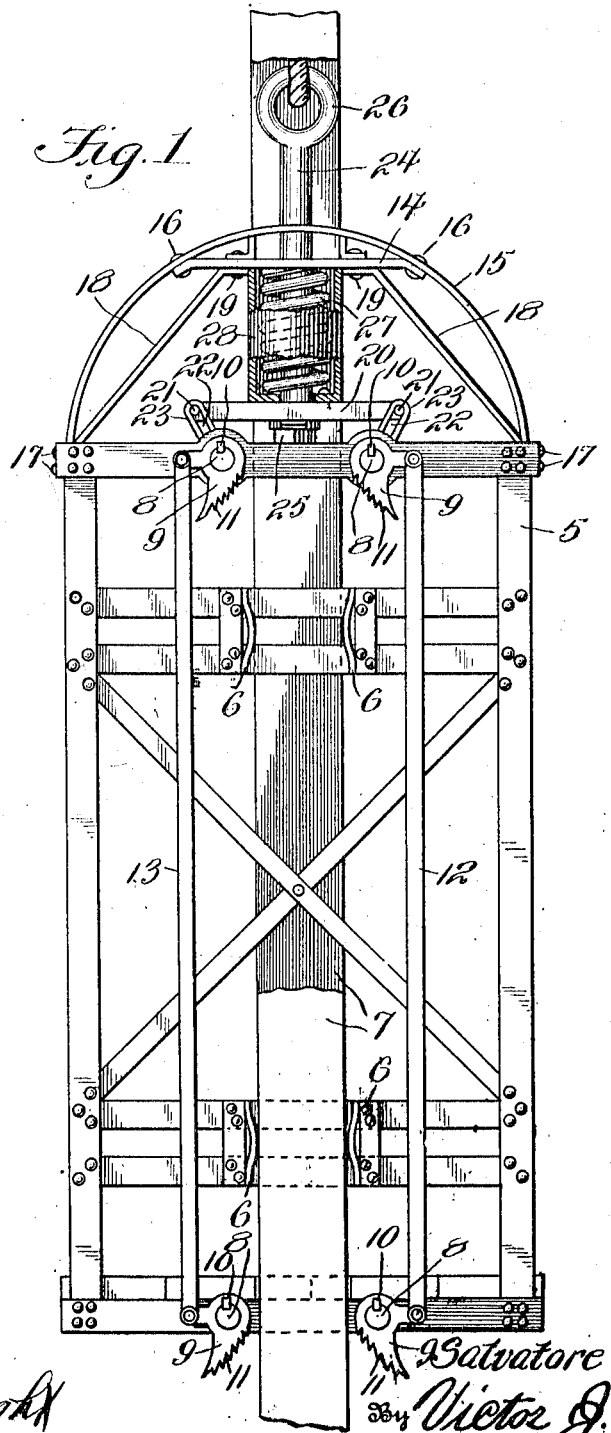

S. SANNA.
ELEVATOR CLUTCH.
APPLICATION FILED JUNE 24, 1911.

1,031,470.

Patented July 2, 1912.
2 SHEETS—SHEET 1.

Witnesses
J. T. L. Wright
John A. Dwigg

Inventor
Salvatore Sanna
By Victor J. Evans
Attorney

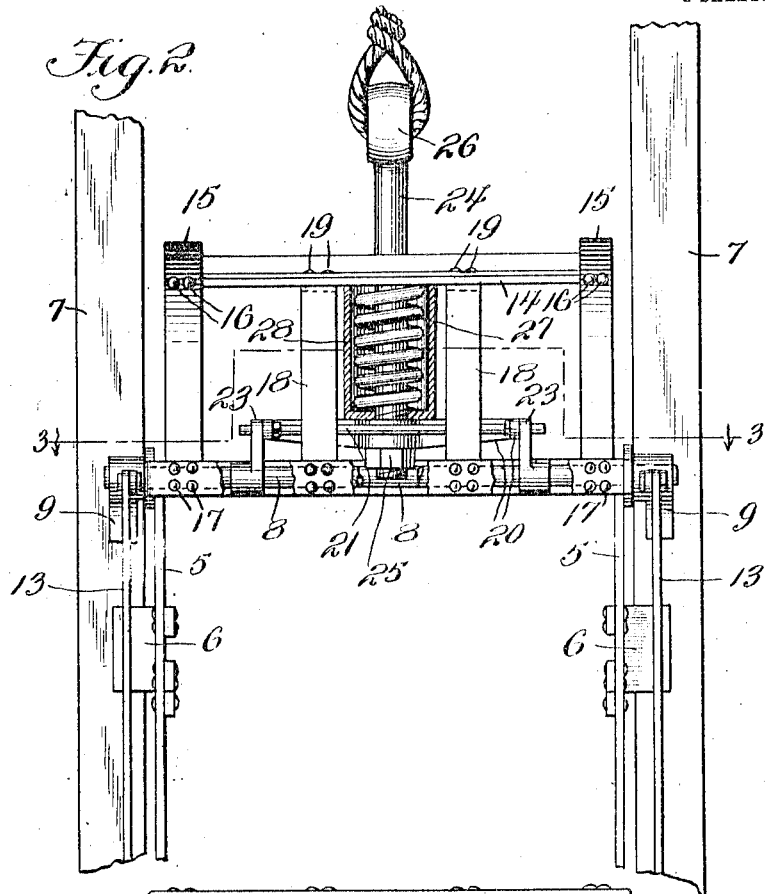
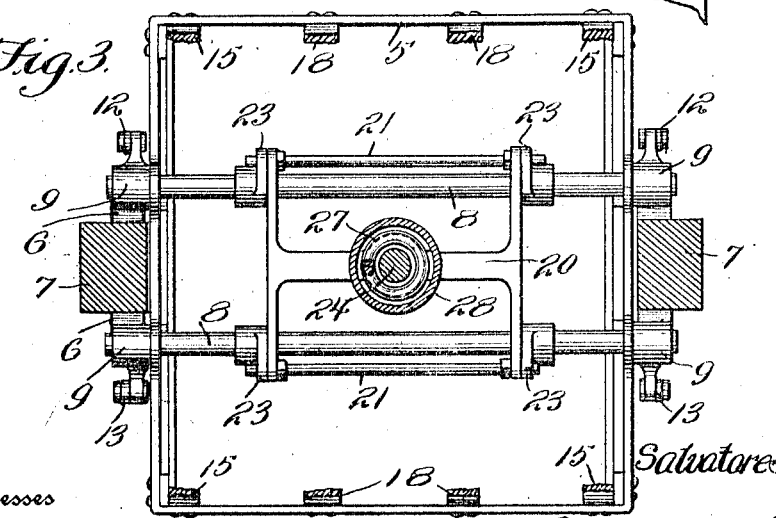

UNITED STATES PATENT OFFICE.

SALVATORE SANNA, OF OLINGHOUSE, NEVADA.

ELEVATOR-CLUTCH.

1,031,470.

Specification of Letters Patent. Patented July 2, 1912.

Application filed June 24, 1911. Serial No. 635,150.

*To all whom it may concern:*

Be it known that I, SALVATORE SANNA, citizen of the United States, residing at Olinghouse, in the county of Washoe and State of Nevada, have invented new and useful Improvements in Elevator-Clutches, of which the following is a specification.

The object of the invention is to simplify and reduce the cost of manufacturing elevator clutches without detracting from their efficiency or durability.

Other objects will appear and be better understood from the following description taken in connection with the accompanying drawings in which:

Figure 1 is a side elevation of a cage provided with my device; Fig. 2 is a detail front elevation of the upper end of the cage shown in Fig. 1 with parts thereof broken away; Fig. 3 is a sectional plan view on the line 3—3 of Fig. 2.

In the embodiment shown the cage 5 has the usual slides 6 which bear on the opposite sides of the guides 7. Rock shafts 8 extend transversely of the cage 5 and have bearings in the opposite sides of the same and at the upper and lower portions of said sides as shown in the drawing and are arranged on either side of the guides 7. Dogs or clutch members 9 are suitably secured such as by keys 10 to the opposite ends of the rock shafts 8. The adjacent faces of the dogs are provided with teeth 11 which engage with the guides 7 when the dogs are moved in one direction in a manner to be presently described. The links 12 connect the dogs located to one side of the guides 7 and similar links 13 connect the dogs located adjacent to the opposite sides of the guides. A bearing plate 14 is supported by arches 15 connected to the plate 14 in any suitable manner such as by rivets 16 and further connected to the upper end of the cage in any suitable manner such as by rivets 17. The plate is additionally supported by means of struts 18 connected thereto and to the upper end of the cage in any suitable manner such as by rivets 19.

The supporting mechanism for the cage, exclusively of the ordinary cable, is herein shown to comprise a horizontally disposed platform 20 located below the bearing 14 and connected to the rock shafts 8 by means of pins 21 which are received by slots 22 formed in cranks 23 which are fixedly secured to the rock shafts 8. In their normal positions the cranks 23 at either end of the platform diverge as shown and the pins on the platform are held to the upper ends of the slots by means of the ordinary bolt 24 which passes through the bearing plate 14 and through the central portion of the platform 20 and having at its lower end a head 25 which bears on the lower face of the platform 20. The upper end of the bolt 24 has an eye 26 to receive the supporting cable as shown. A helical thrust spring 27 surrounds the bolt and bears on the platform 20 and bearing plate 14. When the platform is in the position shown in Fig. 1 the spring 25 will be pressed so that in the event of the cable or its operating mechanism, breaking the spring will expand and move the platform downwardly. The downward movement of the platform will turn the rock shafts 8 and the toothed faces of the dogs or clutch members into engagement with the guides 7 whereby the car will be supported by the dogs and guides and prevented from falling to the bottom of the shaft. A casing 28, which corresponds to the length of the spring when the same is tensioned, surrounds the spring and is supported from the platform so that its upper edge will bear on the plate 14 whereby the compression of the spring will be limited and the cranks prevented from turning beyond the positions shown.

Although I have shown and described one form of my device it is to be understood that I am not to be limited to the structure shown and described, since various changes may be made within the scope of the claim without departing from the spirit of the invention.

What is claimed as new is:

In a safety device for elevators, the combination with a cage; of a bodily movable platform disposed above the top of the cage, shafts provided with clutch devices and journaled in the upper and lower portions of the cage, links connecting the said shafts, pin and slot connections between the four corners of the platform and the said upper shafts, a spring for actuating the platform to move downwardly and operate the clutch devices and means associated with the platform and coöperating with the cage to limit the tensioning of said spring and including a hollow cylindrical casing of less length than the normal length of the spring and surrounding the same.

In testimony whereof I affix my signature in presence of two witnesses.

SALVATORE SANNA.

Witnesses:
   B. C. LIPSINS,
   J. AARON INGALLS.